United States Patent [19]

Kominami et al.

[11] Patent Number: 4,751,589
[45] Date of Patent: Jun. 14, 1988

[54] METHOD AND APPARATUS FOR REPRODUCING RECORDED VIDEO SIGNAL

[75] Inventors: Hisanori Kominami; Kaichi Tatsuzawa, both of Kanagawa, Japan

[73] Assignee: Sony Corporation, Tokyo, Japan

[21] Appl. No.: 727,381

[22] Filed: Apr. 25, 1985

[30] Foreign Application Priority Data

Apr. 28, 1984 [JP] Japan .................................. 59-87531

[51] Int. Cl.[4] .............................................. H04N 5/78
[52] U.S. Cl. .................................. 360/10.3; 360/72.1
[58] Field of Search ............................ 360/10.1–10.3, 360/14.1–14.3, 32, 33.1, 72.2, 72.1

[56] References Cited

U.S. PATENT DOCUMENTS

4,000,510 12/1976 Cheney et al. ................. 360/72.2 X
4,511,931 4/1985 Bixby .................................. 360/10.3
4,538,377 12/1985 Collins et al. ..................... 360/10.3
4,614,979 9/1986 Sugiyama et al. ............. 360/33.1 X Primary Examiner—Aristotelis M. Psitos
Attorney, Agent, or Firm—Lewis H. Eslinger

[57] ABSTRACT

A recorded video signal reproduction in digital process involves switching among a plurality of field memories into which to store image data for one video field picked up by a rotary head and from which to retrieve image data for reproduction, each time the scanning for one record area is completed. The method also includes a process for detecting reversal of a tape drive direction and disabling the switching among field memory for a given period so as to hold the video image reproduced on a video monitor unchanged.

22 Claims, 6 Drawing Sheets

| READ DATA MEMORY | E10 #2 | O11 #3 | E11 #1 | O12 #2 | E12 #3 | O13 #1 | O13 #1 | O13 #3 | E12 #2 | O12 #1 | E11 #3 |
|---|---|---|---|---|---|---|---|---|---|---|---|
| REPRODUCTION DATA Vin | O11 / E11 | E11 / O12 | O12 / E12 | E12 / O13 | O13 / E13 | E13 / O13 | O13 / E13 | E12 / O12 | O12 / E12 | E11 / O11 | O11 |
| WRITE MEMORY | #3 | #1 | #2 | #3 | #1 | #2 | #3 | #2 | #1 | #3 | #2 |
| SELECTION CODE QCQBQA | 100 | 101 | 110 | 111 | 010 | 011 | 011 | 010 | 111 | 110 | 101 |

←——— FORWARD ———  ——— REVERSE ———→

FIG.9

| READ DATA MEMORY | E10 #2 | O11 #3 | E11 #1 | O12 #2 | E12 #3 | E12 #3 | O13 #1 | E12 #2 | O12 #1 | E11 #3 | O11 #2 |
|---|---|---|---|---|---|---|---|---|---|---|---|
| REPRODUCTION DATA Vin | O11 / E11 | E11 / O12 | O12 / E12 | E12 / O13 | O13 / E13 | O13 / E13 | O13 / E12 | E12 / O12 | O12 / E11 | E11 / O11 | E10 |
| WRITE MEMORY | #3 | #1 | #2 | #3 | #1 | #2 | #1 | #3 | #2 | #1 |
| SELECTION CODE QCQBQA | 100 | 101 | 110 | 111 | 010 | 010 | 111 | 110 | 101 | 100 |

←——— FORWARD ———  ——— REVERSE ———→

METHOD AND APPARATUS FOR REPRODUCING RECORDED VIDEO SIGNAL

BACKGROUND OF THE INVENTION

The present invention relates generally to a method and an apparatus for reproducing a recorded video signal. More particularly, the invention relates to recorded video signal reproduction applicable to digital video tape recorders.

Some recent digital video tape recorders have systems for recording and distributing samples from each field of image data among a plurality of separate track blocks on a single track, such as by shuffling or interleaving for added data fidelity.

Figure 2:
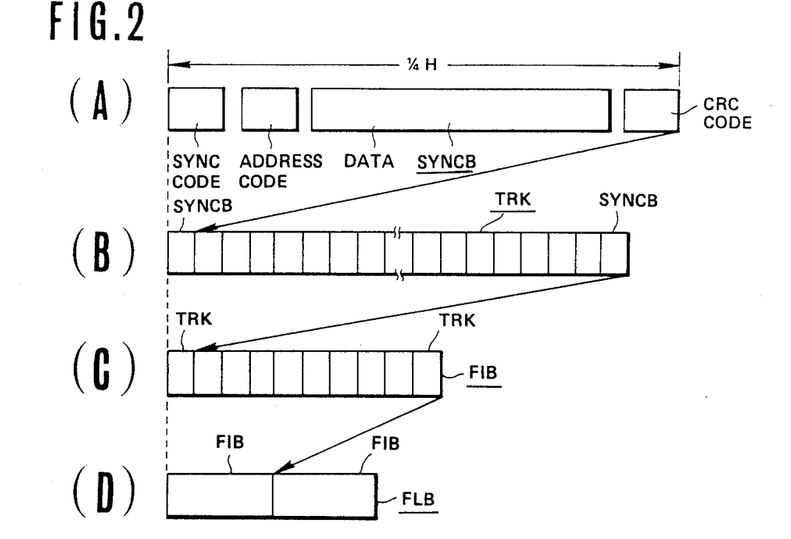
FIGS. 2A to 2D are diagrams illustrating the organization of data recorded on a video tape serving as a recording medium.

The organization of data recorded on the digital video tape is shown diagrammatically in FIG. 2. FIG. 2A shows one synchronization block containing image data (DATA) for one-fourth horizontal line ($\frac{1}{4}$H). In addition to the DATA block, the synchronization block (SYCB) includes synchronization code (SYNC CODE), address code and cyclic redundancy check code (CRC CODE) blocks. A number of synchronization blocks (SYCB) are strung together to form a track block (TRK) covering 1/N field, as shown in FIG. 2B. N, i.e. 10, track blocks (TRK) form one field block (FIB), as shown in FIG. 2C. This one field block (FIB) contains image data covering one field. In the reproduction process, the image data recorded in each ten track blocks is reproduced by means of a reproducing head and recorded in a field memory. The image data for one field is then retrieved from the field memory at a predetermined speed for reproduction on a video monitor.

Two field blocks (FIB) form one frame block (FLB). The frame block (FLB) thus contains image data for successive odd- and even-numbered fields including image data for one screen page on the video monitor.

Figure 3:
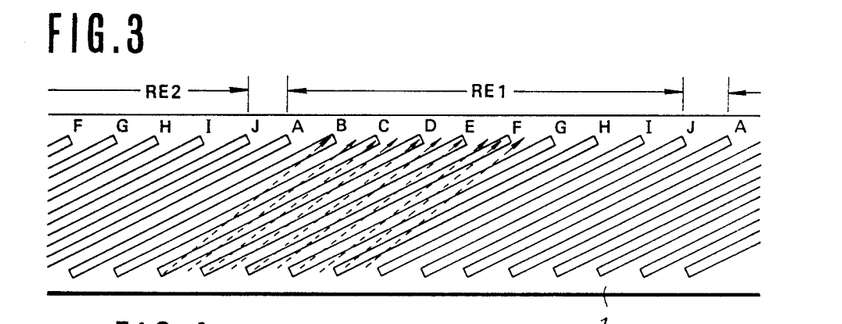
FIG. 3 is a diagram showing the relationship between recording head scan and rotary head speed.
Figure 4:
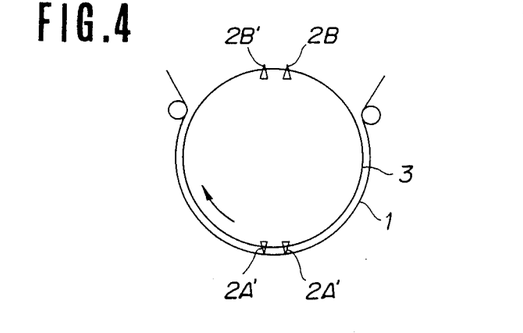
FIG. 4 is a plan view of a rotary video head.

The image data organized as above is recorded on the video tape in the form shown in FIG. 3. Four recording/reproducing heads 2A, 2A' and 2B, 2B' are used to record the image data on the video tape. During recording, the video tape is driven at a predetermined constant speed. The recording/reproducing heads 2A, 2A' and 2B and 2B' are mounted on a rotary drum 3 for rotation therewith in synchronism with the video tape drive. Each pair of recording/reproducing heads 2A, 2A' and 2B, 2B' are arranged side-by-side and the two pairs are diametrically opposed. Each pair of heads 2A, 2A' and 2B, 2B' serves to record data for two neighboring track blocks simultaneously. First (odd number) record fields $RE_1$ consisting of ten track blocks each and second (even number) record field $RE_2$ also consisting of ten track blocks are recorded alternatingly.

The image data recorded on the video tape can be reproduced in various ways. For example, the recorded image data may be reproduced in a normal REPLAY mode in which the video tape 1 is driven at the predetermined normal speed, a HIGH-SPEED SEARCH mode in which the video tape is driven at a much higher speed, for example at a speed 8-times faster than the normal speed, a SLOW mode in which the video tape is driven a slower speed, e.g. $\frac{1}{3}$ the normal speed, and a STILL mode in which the tape drive is temporarily stopped.

In the normal REPLAY mode, the recording/reproducing heads 2A, 2A' and 2B, 2B' can scan every track block in order to pick up all of the image data at relatively high fidelity. On the other hand, when the video tape recorder is operated in SLOW mode, the heads 2A, 2A' and 2B, 2B' scan across the tape as shown in broken line in FIG. 3. As shown in FIG. 3, the scanning angle of the heads is steeper than the angle of the track blocks, so that the heads tend to scan more than one track block in each scan cycle. Therefore, the reproduced input video signal Vin contains image data for more than one track block.

This will not cause serious problems as long as the heads scan track blocks within the same field (also called "record area"). However, when the heads cross track blocks from different, adjoining record areas, image data from both record areas will be included in the input video signal Vin. For example, when heads scan the first track block A of the first record area $RE_1$, they tend to also scan the last, i.e. tenth track block J of the preceding second record block $RE_2$. In this case, the input video data contains image data from both the first and second record areas $RE_1$ and $RE_2$. This means that the input video signal Vin includes both odd-numbered field image data and even-numbered field image data. This requires special signal processing to separate the odd-numbered field image data from the even-numbered field image data.

In particular, when the tape drive is switched between forward drive and reverse drive, proper time sequence control is needed for image data picked up before and after reversing the tape drive direction, so that the video image displayed on the video monitor will not be disrupted or distorted.

In order to ensure good video fidelity when reversing the tape drive direction, it is necessary to temporarily hold the system in the STILL mode for a given period during which a single constant image will appear on the video monitor.

SUMMARY OF THE INVENTION

Therefore, it is an object of the invention to provide a method for reproducing a recorded video signal which ensures high-fidelity image reproduction under all conditions.

Another object of the invention is to provide a method for reproducing a recorded video signal which allows reversing of the tape drive direction without disturbance of the reproduced image on the video monitor, even during SLOW mode operation.

In order to accomplish the above-mentioned and other objects, a method for reproducing a recorded video signal involves switching among a plurality of field memories into which to store image data for one video field picked up by a rotary head and from which to retrieve image data for reproduction, each time the scanning for one record area is completed. The method also includes a process for detecting reversal of a tape drive direction and disabling the switching among field memories for a given period so as to hold the video image reproduced on a video monitor unchanged.

According to the reproducing method, one field of image data stored in one field memory is subsequently accessed for retrieval after completion of the scanning of the corresponding record area.

According to one aspect of the invention, a method for reproducing a video signal recorded on a video tape, on which the image data for one video field is recorded in the form of a plurality of track blocks, comprises the steps of:

providing at least three field memories for storage of image data for one field picked up from the video tape, and for later retrieval thereof for video reproduction;

selectively accessing one of said field memories for storage of said image data, and switching access to another field memory after all of the image data for one field has been stored;

accessing one of said field memories for retrieval of image data stored in an immediately preceding memory access cycle;

detecting reversal of tape drive direction between a forward direction and a reverse direction;

disabling switching of the access to said retrieval field memory for a given period in response to reversal of said tape drive direction.

The method also includes the steps of detecting image data on the video tape from a field other than the field from which image data is being stored and accessing another field memory not currently in use for storage or retrieval for storage of the image data of said other field.

The given period is variable depending upon the scanning condition of the rotary head. For instance, when the rotary head is scanning a single field or record area, the given period may be shorter than when the rotary head is scanning more than one record area.

The switching among the field memories or disablement thereof, is triggered by a pulse signal produced each time the scanning of one record area is completed.

It is another object of the present invention to provide an apparatus for reproducing a recorded video signal, which can maintain a high-quality reproduced image on a video monitor under all conditions.

Another object of the invention is to provide an apparatus for reproducing a recorded video signal which can ensure a continuous, high-quality reproduced image on a video monitor even when the tape drive is reversed during SLOW-mode operation.

In order to accomplish the above-mentioned and other objects, an apparatus for reproducing a video signal includes at least three memories, each capable of storing all of the image data for one field. One of the memories is selected for storage of image data currently being picked up from one record area of the recording medium. The memory selection is performed anew each time the scanning of one field is completed, whereupon a different memory is selected for storage of the image data from the next field. At the same time, another memory is selected for retrieval of stored image data for video reproduction. The memory selected for retrieval is the memory which was selected for storage of image data in the immediately preceding memory selection cycle. Reversal of the tape drive disables retrieval memory selection for a given period, which period may depend upon scanning conditions of the recording medium.

According to one aspect of the invention, an apparatus for reproducing a video signal recorded on a recording medium in the form of a plurality of tracks comprises:

a memory means including at least three memories, each capable of holding all of the image data for one video field picked up from the medium by a scanning reproduction head;

storage control means for selecting one of said memories in said memory means for storage of the image data of the video field currently being scanned by the head said storage control means selecting memories in a given order;

retrieval control means for selecting one of said memories currently holding one field of image data picked up in the immediate preceding memory selection cycle for retrieval and output of the stored image data as an output video signal;

a memory condition detecting means for monitoring the selection condition of said memory;

a drive direction detecting means for detecting reversal of the tape drive direction; and a memory switching disabling means, responsive to reversal of the tape drive direction, for disabling selection of a different memory for retrieval and output of the stored data for a period of time related to the memory selection conditions detected by said memory condition detecting means.

According to another aspect of the invention, an apparatus for reproducing a video signal recorded on a recording medium in the form of a plurality of tracks, comprises a memory means including at least three memories, each capable of holding all of the image data for one field picked up from the recording tracks of the recording medium by a reproduction head;

storage control means for selecting one of said memories in said memory means for storage of the image data from the field currently being picked up by said head, said storage control means selecting the memories in a given order detecting inclusion of image data from more than one field in an input video signal from said head and selecting more than one memory for storage of image data for each field separately;

retrieval control means for selecting one of said memories currently holding one field of image data picked up in the immediate preceding memory selection cycle for retrieval and output of the stored image data as an output video signal;

a memory condition detecting means for monitoring the selection condition of said memory;

a drive direction detecting means for detecting reversal of the tape drive direction; and a memory switching disabling means, responsive to reversal of the tape drive direction, for disabling selection of a different memory for retrieval and output of the stored data for a period of time related to the memory selection conditions detected by said memory condition detecting means.

The memory condition detecting means includes a pulse generator which produces a pulse signal each time the scanning of one field of image data is completed.

The disabling period starts in response to reversal of the tape drive and ends in response to the pulse signal produced by the pulse generator. This period varies according to the memory selection conditions detected by the memory condition detecting means.

BRIEF DESCRIPTION OF THE DRAWINGS

The present invention will be understood more fully from the detailed description given below and from the accompanying drawings of the preferred embodiment of the invention, which, however, should not be taken to limit the invention to the specific embodiments but are for explanation and understanding only.

In the drawings.

DESCRIPTION OF THE PREFERRED EMBODIMENT

Figure 1:
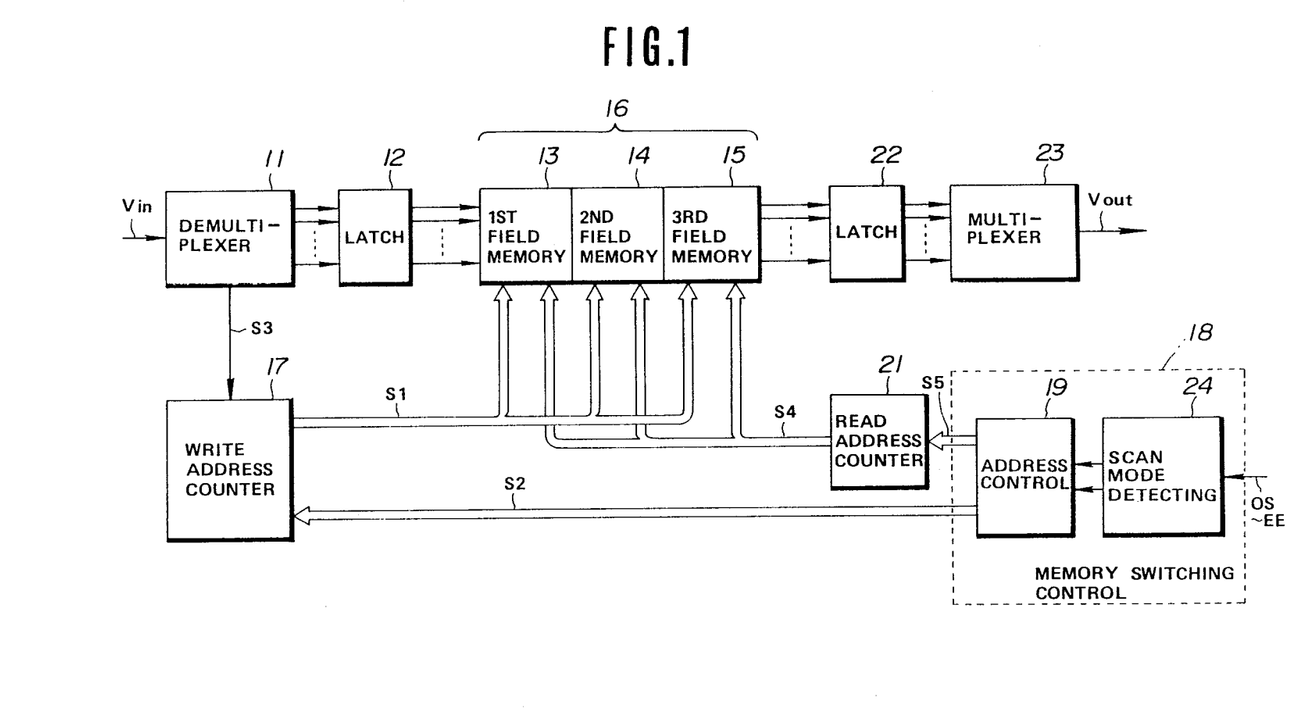
FIG. 1 is a schematic block diagram of the preferred embodiment of a recorded video signal reproducing apparatus according to the present invention.

Referring now to the drawings, particularly to FIG. 1, the preferred embodiment of a video signal reproducing system according to the present invention includes a demultiplexing circuit 11 converting a serial input signal $V_{in}$ derived by reproducing video signal data recorded on a magnetic video tape 1 into parallel data signals. The converted parallel data is conducted from the demultiplexing circuit 11 to a latching circuit 12. The system has first, second and third field memories 13, 14 and 15, which serves as image data memories and together constitute a single video signal memory 16. The first, second and third field memories 13, 14 and 15 are connected to receive the latched parallel data from the latching circuit 12 as image data. The field memories 13, 14 and 15 of the video signal memory 16 are also connected for control input from a write address counter 17 which generates a write address signal $S_1$ identifying the next address in memory to be used for storage. The field memories 13, 14 and 15 are controlled by the write address signal $S_1$ to store the image data from the latching circuit in a memory area starting at the address identified by the write address signal.

The write address counter 17 is connected for input from a memory switching control circuit 18 which includes an address control circuit 19. The address control circuit 19 outputs an address load signal $S_2$ to the write address counter 17. The address load signal $S_2$ specifies a loading address. The write counter periodically increments the loading address in order to derive the write address signal for output in response to a reproduction locking signal $S_3$ from the demultiplexing circuit 11.

The first, second and third field memories 13, 14 and 15 are also connected for control input from a read address counter 21, specifically to receive a read address signal $S_4$ which identifies the next address in the memory to be accessed for data retrieval. The field memories 13, 14 and 15 respond to the read address signal $S_4$ from the read address counter 21 by retrieving the image data recorded in the memory area starting at the address specified by the read address signal $S_4$.

The read address counter 21 is, in turn, connected for input from the address control circuit 19 in the memory switching control circuit 18 to receive an address load signal $S_5$. The read counter 21 increments or decrements a loading address specified by the address load signal $S_5$. The counter value of the read address counter 21 specifies which of the first, second and third field memories 13, 14 and 15 is to be accessed.

The image data retrieved from the proper field memory 13, 14 or 15 of the video signal memory 16 in response to the read address signal $S_5$ from the read address counter 21 is fed to a multiplexing circuit 23 via a latching circuit 22. The multiplexing circuit 23 converts the parallel data latched by the latching circuit 22 into a serial reproduced video output signal $V_{out}$.

The memory switching control circuit 18 generally selects one of the first, second and third field memories 13, 14 15 in accordance with a memory-management mode selected on the basis of the data recorded on the magnetic tape 1 which depends upon the reproduction mode and drive direction selected manually via a control panel (not shown). A scanning mode detecting circuit 24 connected for output to the address control circuit 19 outputs a signal identifying the current reproduction mode.

As shown in FIG. 3, the video tape 1 to which the preferred embodiment of the video signal reproducing system of the invention is applied has a plurality of helical tracks A through J. As will be appreciated from FIG. 3, each group of helical tracks A through J covers one field of image data. The track A resides adjacent the track J of the preceding group of tracks. The track A will be referred to hereafter as "leading boundary track" and the track J will be referred to as "trailing boundary track". Furthermore, each group of tracks consisting of the tracks A through J will be referred to hereafter as a "record area". Record area covering odd-numbered fields will be referred to as "odd-numbered record areas" and those covering even-numbered fields will be referred to as "even-numbered record areas". Obviously, odd number record areas and even number record areas alternate along the tape with each leading boundary track A adjoining the trailing boundary track J of the preceding record area.

Figure 5:
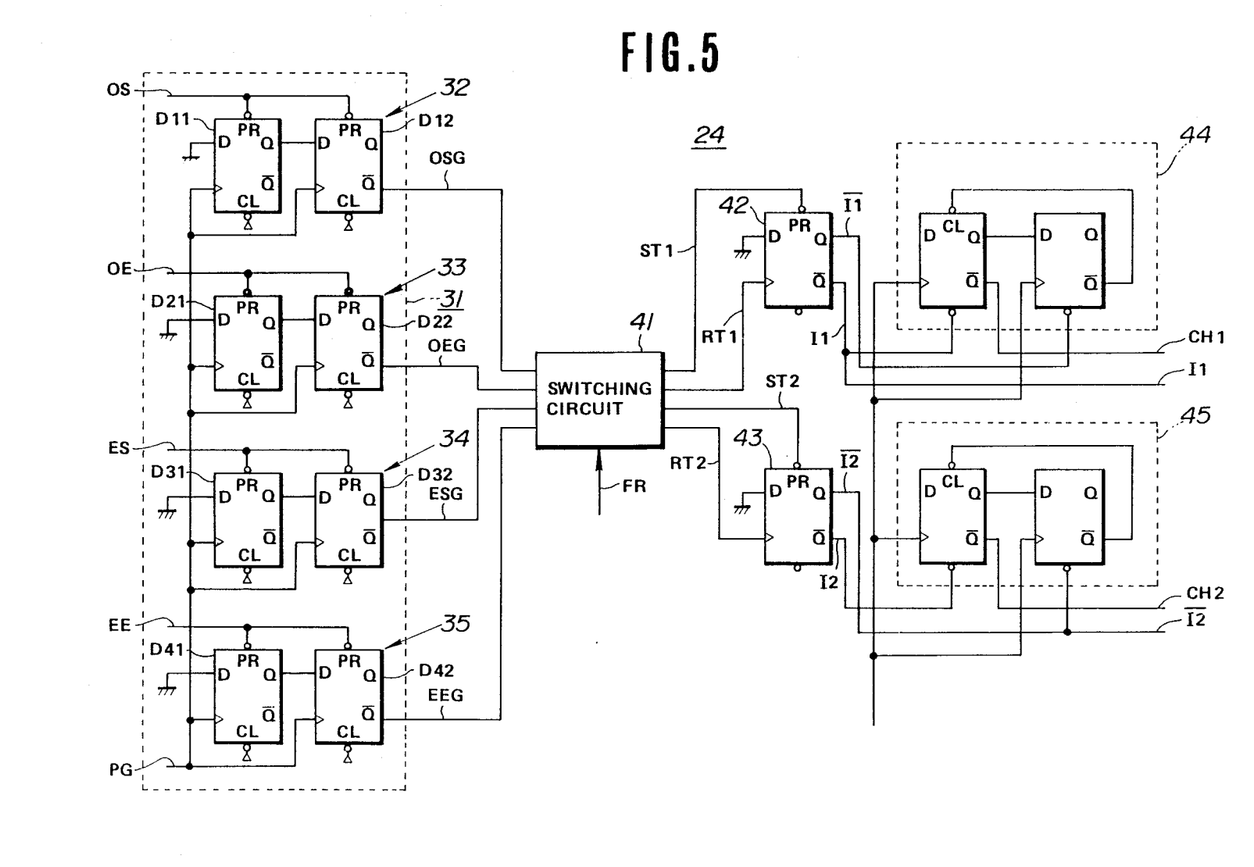
FIG. 5 is a block diagram of a scanning mode detecting circuit of the reproducing apparatus of FIG. 1.

As shown in FIG. 5, the scanning mode detecting circuit 24 includes a boundary track detecting circuit 31. The boundary track detecting circuit 31 detects when the rotary head is scanning one of the boundary tracks A or J. The boundary track detecting circuit 31 includes a first detector circuit 32 having D flip-flop circuits $D_{11}$ and $D_{12}$. The first detector circuit 32 is responsive to a first detecting pulse OS produced when the head moves across the leading boundary track A of the odd number record area $RE_1$. The boundary track detecting circuit 31 also includes a second detector circuit 33 having D flip-flop circuits $D_{21}$ and $D_{22}$. The second detector circuit 33 is responsive to a second detecting pulse OE produced when the head moves across the trailing boundary track J of the odd number record area $RE_1$. The boundary track detecting circuit 31 further includes a third detector circuit 34 having D flip-flop circuits $D_{31}$ and $D_{32}$. The third detector circuit 34 is responsive to a third detecting pulse ES produced when the head moves across the leading boundary track A of the even number record area $RE_2$. The boundary track detecting circuit 31 further includes a fourth detector circuit 35 having D flip-flop circuits $D_{41}$ and $D_{42}$. The fourth detector circuit 35 is responsive to a fourth detecting pulse EE produced when the head moves across the trailing boundary track J of the even number record area $RE_2$.

Figure 6:
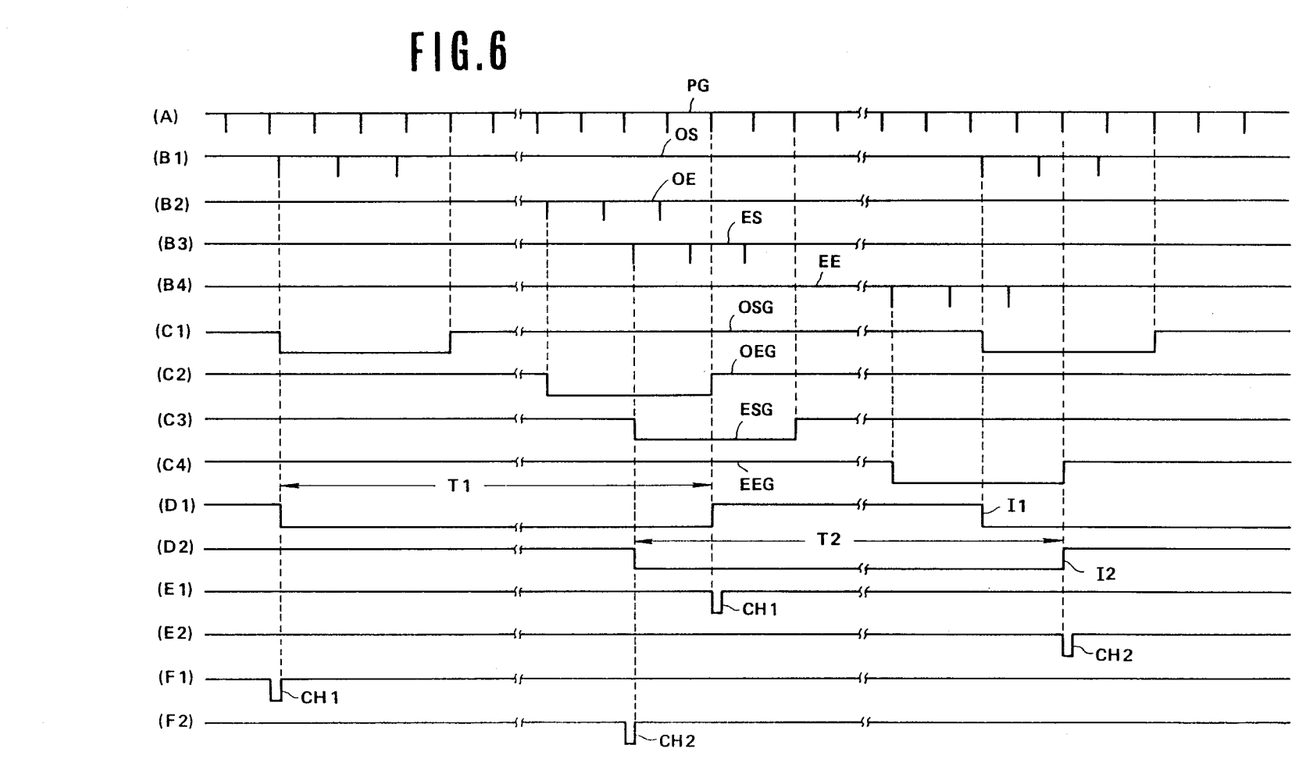
FIG. 6 is a timing chart of signals produced by the circuit elements of the scanning mode detecting circuit of FIG. 5 while the system operates in the SLOW mode.

The detecting pulses OS and OE are produced by a detector circuit (not shown) when it detects an address code of FIG. 2(A) recorded in the leading track A of an odd number record area $RE_1$. Therefore, the detecting pulses OS and OE are produced every time the head moves across the leading track A of an odd number record area $RE_1$. As will be appreciated from a comparison of FIGS. 3 and 6, in the SLOW mode, the phase of the detecting pulses OS and OE shifts through every cycle of the head rotation relative to the head position, as represented by a head position signal PG which will be referred to hereafter as "PG signal", as the heads cross the boundary tracks at different points along the tracks A or J in successive head rotations. After a given number of cycles of rotary head rotation, the head will stop crossing the boundary track altogether until after another, larger number of head rotations. The detecting pulses OS and OE will of course be absent during this period. FIG. 6 shows an example in which the head moves across the leading boundary track A three times in each such cycle of "beating of the head position PS and detecting OS-OE signals".

As the head rotates in the forward direction, the detecting pulses OS and EE will be present while the head first crosses the leading boundary track A of the odd number record area $RE_1$. In other words, the detecting pulses OS and EE will occur in the same head scan when the head moves across both the trailing boundary track J of the even number record area $RE_2$ and the leading boundary track A of the subsequent odd number record area $RE_1$.

Similarly, the detecting pulses ES and OE will nearly coincide when the head first crosses the leading boundary track A of the even number record area $RE_2$.

In summary the first to fourth detecting pulses OS, OE, ES and EE occur when the scanning trace of the head crosses the corresponding leading and trailing boundary tracks A and J of the odd number and even number record areas $RE_1$ and $RE_2$. It then becomes easy to recognize, for example, that the reproducing head is scanning the odd number record area $RE_1$ over the period from the first occurrence of the first detecting pulse SO to the last (third) occurrence of the second detecting pulse OE. Similarly, between the first occurrence of the third detecting pulse ES and the third occurrence of the fourth detecting pulse EE, the reproducing head is scanning the video data stored in the even number record area $RE_2$. It should also be noted that when the reproducing head moves across a leading or trailing boundary track, it may also be crossing the neighboring trailing or leading track of the adjoining record area.

Accordingly, the input video signal Vin sometimes contains image data for both odd number and even number fields. Image data for each field must be recorded in separate field memories 13 to 15 of the video signal memory 16 to allow separate signal processing of each field of image data.

When the reproducing head is driven forwards, the detecting pulses occur in order of the first detecting pulse OS, the second detecting pulse OE, the first detecting pulse ES and the fourth detecting pulse EE. Alternatively, when the reproducing head is driven in the reverse direction, the order of occurence of the detecting pulses is reversed, since the reproducing head moved from the trailing boundary track J towards the leading boundary track A in each record area. Therefore, during reverse driving of the reproducing head, the detecting pulses occur in the following order: the fourth detecting pulse EE, the third detecting pulse ES, the second detecting pulse OE and the first detecting pulse OS. Although the order of occurrence of the detecting pulses differs from that in forward drive, reproducing operations themselves remain substantially the same as in the forward drive mode.

Returning to FIG. 5, the D flip-flop circuits $D_{11}$ and $D_{12}$ each have a preset terminal PR receiving the first detecting pulse OS. The flip-flop circuits $D_{11}$ and $D_{12}$ are set in response to the first detecting pulse OS. Also, the PG signal is applied to the flip-flop circuits $D_{11}$ and $D_{12}$ each have a preset terminal PR receiving the circuits $D_{11}$ is triggered by the PG signal and reset by a logical-0 input at its D-terminal. The D-terminal of the flip-flop circuit $D_{12}$ is connected to the Q-terminal (set output terminal) of the flip-flop circuit $D_{11}$. Therefore, the flip-flop circuit $D_{12}$ is reset when the flip-flop circuit $D_{11}$ is reset. Therefore, the output at the Q-terminal of the flip-flop circuit $D_{12}$ drops to logical-0 in response to the first pulse of the first detecting signal OS. (Note that the detecting pulses OS-EE are all inverse-logic pulses.) After the last pulse of the first detecting signal OS, the output at the $\overline{Q}$-terminal returns to logical 1 in response to two successive second PG signal pulses: The output at the $\overline{Q}$-terminal of the flip-flop circuit $D_{12}$ will be hereafter referred to as "first detector output OSG".

Similarly, the second, third and fourth detector circuits 33, 34 and 35 output the second, third, fourth detector outputs OEG, ESG and EEG through respective $\overline{Q}$-terminals of the flip-flop circuits $D_{22}$, $D_{32}$ and $D_{42}$, in response to the PG signal. Each of the second, third and fourth detector outputs OEG, ESG and EEG varies substantially the same manner as set out with respect to the first detector output OSG. Specifically, each of the second, third and fourth detector outputs OEG, ESG and EEG drops to the logical-0 level in response to the first pulse of corresponding detecting signal OE, ES and EE and returns to the logical-1 level in response to two successive PG signal pulses.

The $\overline{Q}$-terminals of the second-stage flip-flop circuits $D_{12}$, $D_{22}$, $D_{32}$ and $D_{42}$ of the first to fourth detector circuits 32, 33, 34 and 35 are connected for output to a switching circuit 41. The switching circuit 41 is, in turn, connected to an odd number field scan detecting circuit 42 and an even number field scan detecting circuit 43. The odd number field scan detecting circuit 42 and the even number field scan detecting circuit 43 comprise D-flip-flop circuits. The switching circuit 41 is also connected to receive a forward/reverse switching signal FR from a manually operable forward/reverse switch which controls the switch position of the switching circuit 41. The switching circuit 41 outputs set signals $ST_1$ and $ST_2$ in response to the first and third detector outputs OSG and ESG, and outputs reset signals $RT_1$ and $RT_2$ in response to the second and fourth detector outputs OEG and EEG, when the switching signal FR is at a level indicative of forward drive. The set signals $ST_1$ and $ST_2$ lead from the switching circuit 41 to preset terminals PR of the flip-flop circuits 42 and 43 serving respectively as the odd number-field scan detector circuit 42 and the even number field scan detector circuit 43. In addition, the switching circuit 41 applies the reset signals $RT_1$ and $RT_2$ to trigger inputs of the flip-flop circuits 42 and 43.

In the circuit arrangement set forth above, the flip-flop circuit 42 of the odd number field scan detector circuit is set in response to trailing edges of HIGH-level first detector output pulses OSG and is reset by the constant logical-0 input at its D-terminal in response to the leading edge of the HIGH-level second detector output OEG. Therefore, as shown in FIG. 6, $D_1$, the flip-flop 42 outputs through its $\overline{Q}$-terminal an odd number field scan indicative signal $I_1$ which is held at logical-0 value for the period $T_1$ during which the head scans through the odd number record area $RE_1$.

Similarly, the flip-flop circuit of the even number field scan detector circuit 43 is set in response to the trailing edge of HIGH-level third detector output pulses ESG and is reset in response to the leading edge of HIGH level fourth detector output EEG. Therefore, as shown in FIG. 6, $D_2$, the output $I_2$ at the $\overline{Q}$-terminal of the flip-flop 43 is held at logical-0 value for the period $T_2$ during which the head scans through the even number record area $RE_2$.

Alternatively, when reverse drive is selected, the switching circuit 41 outputs the set signal $ST_1$ and $ST_2$ in response to the second and fourth detector outputs EG and EEG, and the reset signal $RT_1$ and $RT_2$ in response to the first and third detector outputs OSG and ESG. The flip-flop circuit 42 is set in response to the trailing edge of the HIGH-level second detector output OEG and reset in response to the leading edge of the first detector output OSG. Therefore, as above, the output $I_1$ at the $\overline{Q}$-terminal of the flip-flop circuit 42 is held at logical-0 value for the period $T_1$ during which the head scans in the reverse direction through the odd number record area $RE_1$, as shown in FIG. 6, $D_1$. Likewise, the flip-flop circuit 43 is set in response to the trailing edge of the fourth detector output EEG and reset in response to the leading edge of the third detector output ESG. Thus, the output $I_2$ at the $\overline{Q}$-terminal of the flip-flop circuit 43 is held at logical-0 value for the period $T_2$ during which the head scans in reverse direction through the even number record area $RE_2$.

It should be appreciated that, in FIG. 6, the time axis progresses from right to left and the detector outputs OSG, OEG, ESG and EEG drop at points coincident with the first pulse of the corresponding detecting pulse OS, OE, ES and EE and remain at logical 0 until the second PS pulse following the last pulse of the corresponding detecting pulse.

The flip-flop circuits 42 and 43 have inverting output terminals ($\overline{Q}$-terminal) through which the logical inverts of the odd number field scan indicative signal $\overline{I}_1$ and the even number field scan indicative signal $\overline{I}_2$ respectively are output, as shown in FIG. 6, $E_1$ and $E_2$. These inverted signals $\overline{I}_1$ and $\overline{I}_2$ are processed by differentiation circuits 44 and 45. The differentiation circuits 44 and 45 respond to the leading edge of the respectively corresponding inverted signal $\overline{I}_1$ and $\overline{I}_2$ to output switching pulses $CH_1$ and $CH_2$, during forward drive operation.

Alternatively, in reverse drive operation, the differentiation circuits 44 and 45 output the switching signals $CH_1$ and $CH_2$ in response to the trailing edge of the corresponding inverted signals $I_1$ and $I_2$. Therefore, as can be easily appreciated, the differentiation circuits 44 and 45 output the switching pulses $CH_1$ and $CH_2$ every time the scan switches between an odd number field and an even number field according to change of the logical level of the input from the flip-flop circuits 42 and 43 as set forth above.

Figure 7:
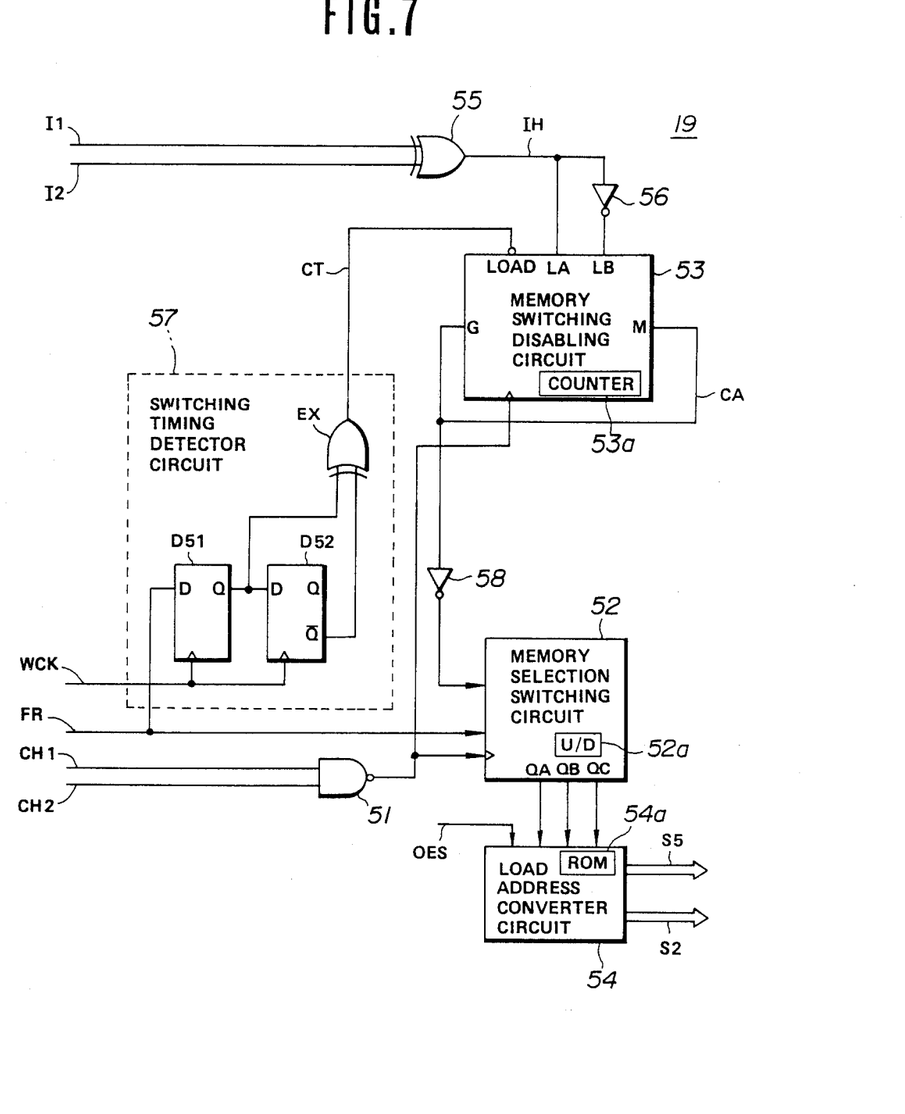
FIG. 7 is a block diagram of an address control circuit of the reproducing apparatus of FIG. 1.

As shown in FIG. 7, the switching pulses $CH_1$ and $CH_2$ are output to a NAND gate 51 which is, in turn, selected for output to a memory selection switching circuit 52 and a memory switching disabling circuit 53. In this arrangement, the gate signal of the NAND gate 1 serves as a trigger signal for the memory selection switching circuit 52 and the memory switching disabling circuit 53.

As shown in FIG. 7, the $\overline{Q}$-terminals of the flip-flops 42 and 43 are connected to an exclusive OR gate 55 which serves as a disabling condition detector.

The memory selection switching circuit 52 selects into which of the field memories 13, 14 and 15 the odd number and even number field image data from the reproducing head are to be stored. The memory selection switching circuit 52 similarly serves to specify from which of the field memories 13, 14 and 15 recorded image data are to be retrieved.

The memory selection switching circuit 52 is also connected to the manually operable forward/reverse switch to receive the forward/reverse switching signal FR as up/down control signal. The circuit 52 includes an up/down counter 52a to increment and decrement the memory selection code. These changes in the up/down counter 52a are controlled in accordance with the forward/reverse switching signal FR. That is, the up/down counter 52a increments the memory selection code during the forward drive operation and decrements it during reverse drive operation. The resultant counter value of the up/down counter 52a is fed to a load address converter circuit 54. As shown in FIG. 7, the counter value is output in the form of 3 binary signals QC, QB and QA, making up a 3-bit code. Therefore, the load address converter circuit 54 receives QC, QB and QA as counter value indicative data.

The load address converter circuit 54 derives a writing address load signal $S_2$ on the basis of the 3-bit counter output QC, QB and QA. The write address load signal $S_2$ is output to the write address counter 17 as mentioned previously. The load address converter circuit 54 also derives a read address load signal $S_5$ on the basis of QC, QB and QA to identify which of the field memories 13, 14 and 15 to access. The read address load signal $S_5$ is fed to the read address counter 21.

The load address converter circuit 54 also receives an odd/even field indicative signal OES recorded on the video tape and picked up by the reproducing head 2. The load address converter circuit 54 further includes ROM 54a storing a look-up table scheduling access to the several field memories 13, 14 and 15.

The look-up table stored in ROM 54a is as follows:

| OES | QC | QB | QA | S2 Odd | S2 Even | S5 |
|---|---|---|---|---|---|---|
| O   | 0 | 1 | 0 | #1 |    | #3 |
| O/E | 0 | 1 | 0 | #1 | #2 | #3 |
| E   | 0 | 1 | 1 |    | #2 | #1 |
| O/E | 0 | 1 | 1 | #3 | #2 | #1 |
| O   | 1 | 0 | 0 | #3 |    | #2 |
| O/E | 1 | 0 | 0 | #3 | #1 | #2 |
| E   | 1 | 0 | 1 |    | #1 | #3 |
| O/E | 1 | 0 | 1 | #2 | #1 | #3 |
| O   | 1 | 1 | 0 | #2 |    | #1 |
| O/E | 1 | 1 | 0 | #2 | #3 | #1 |
| E   | 1 | 1 | 1 |    | #3 | #2 |
| O/E | 1 | 1 | 1 | #1 | #3 | #2 |

Values for signals S2 and S5 are found in the table in ROM 54a in terms of the code signal values QA, QB and QC and the odd/even field indicative signal OES.

Figure 8:
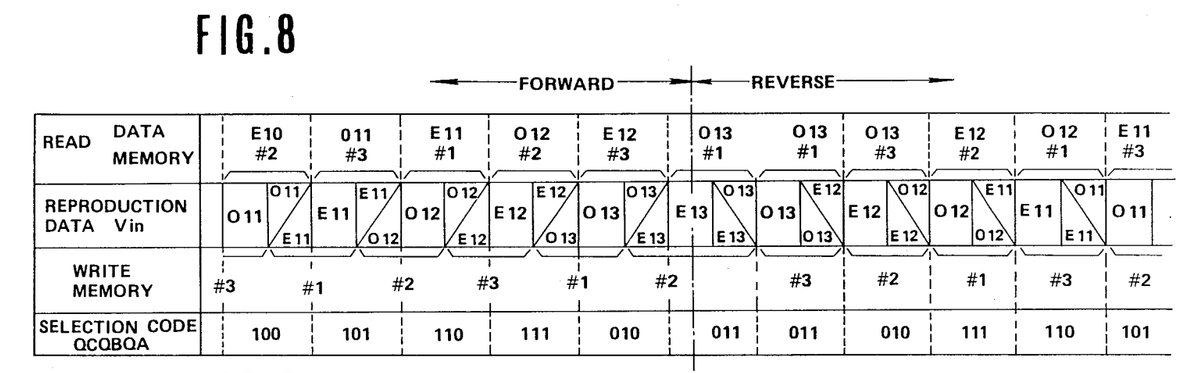
FIGS. 8 and 9 are diagrams illustrating the operation of the address control circuit of FIG. 7.

For example, when the number represented by the code signal QC, QB and QA is "010", and the odd/even field indicative signal OES indicates scanning of the odd number field only, the load address converter circuit 54 generates a write address load signal identifying the first field memory 3 and a read address load signal $S_5$ identifying the third field memory 15, as shown in FIG. 8. In response to the write address load signal S₂ and the read address load signal S₅ thus derived, the image data is stored in the first field memory 13 and recorded image data in the third field memory 15 is read out. On the other hand, when the code signal is "010" and the odd/even field indicative signal OES indicates scan of both odd- and even-numbered fields, the write address load signal S₂ specifies both of the first and second field memories 13 and 14. At the same time, the read address load signal S₅ specifies the third field memory 15. In this case, the image data for the odd number field is stored in the first field memory 13 and the even number field image data is stored in the second field memory 14. As above, the image data recorded in the field memory 15 is read out, at the same time.

Therefore, the image data recorded in the third field memory 15 is, at this time, reproduced on a video monitor.

After storing the image data in one of the field memories 13, 14 and 15, the switching pulse CH₁ and CH₂ is produced. The memory selection switching circuit 52 is responsive to the switching pulses CH₁ and CH₂, to increment or decrement the code signal QA, QB and QC in a predetermined order according to forward-/reverse drive identified by the forward/reverse indicative signal FR. Therefore, in the above example, the memory selection switching circuit 52 outputs the code signals QC, QB and QA reading "011" in response to the switching pulses CH₁ and CH₂. In this case, the even field image data would be stored in the second field memory 14 and the odd number field image data would be stored in the field memory 15. In addition, the first field memory 13 would be accessed for the previously stored image data.

As will be appreciated herefrom, the memory selection switching circuit 52 increments or decrements the up/down counter value in response to each switching pulse CH₁ and CH₂ to update the read/write states of the first, second and third field memory 13, 14 and 15. The field memories 13, 14 and 15 are selectively designated for storage of image data according to the order determined by the look-up table in ROM 54a of the load address converting circuit 54. On the other hand, the field memory to which writing in the image data is finished, is subsequently accessed for the previously stored image data. Therefore, in the foregoing example, since the field memory 13 will have completed its writing operation at the next change of the switching pulses CH₁ and CH₂, the image data recorded in the first field memory 13 will be read out next, after the code signal value changes from "010" to "011".

Here, in the shown embodiment, the code signal value may shift, during forward drive operation, in the table sequence "010", "011" . . . "111", "010". On the other hand, during reverse mode operation, the code signal value may shift through the reverse order: "010", "111", "110" . . . "010". The order of selection of the field memories 13, 14 and 15 for image data storage and image data retrieval is reversed when the head drive direction is reversed.

Without saying, in the foregoing example, when the code signal value switches from "011" to "100", the second field memory 14, in which the even number field data is all stored before the next switching pulse CH₁ or CH₂, is next accessed for retrieval of the stored image data.

The memory selection switching circuit 52 and the load address converter circuit 54 together form the address control circuit 19 in conjunction with the memory switching disabling circuit 53. The memory switching disabling circuit 54 disables the switching operation of the memory selection switching circuit 52. The memory switching disabling circuit 53 comprises a counter 53a clocked by the output of the NAND gate 51. The memory switching disabling circuit 53 also has a load data input terminal LA which is directly connected for input from the exclusive-OR gate 55, and another load data input terminal LB which is connected for input from the exclusive-OR gate 55 through an inverter 56.

The exclusive-OR gate 55 receives the odd-numbered field indicative Q-terminal output I₁ and the even number field indicative Q-terminal output I₂ as condition inputs. On the basis of the condition inputs, the exclusive-OR gate 55 outputs a condition signal I_H to the load data input terminal LA and inverted load condition signal I_H to the load input terminal LB through the inverter 56.

On the basis of the inputs from the Q-terminals of the flip-flop circuits 42 and 43, the disabling circuit derives disabling condition according to the following table.

TABLE II

| I₁ | I₂ | LB | LA | Disabling release Condition |
|---|---|---|---|---|
| 1 (odd) | 0 (even) | 0 | 1 | 2 times |
| 0 (even) | 1 (odd) | 0 | 1 | 2 times |
| 1 (odd) | 1 (odd) | 1 | 0 | 1 time |
| 0 (even) | 0 (even) | 1 | 0 | 1 time |

As will be appreciated herefrom, when the reproducing head scans both an odd number record area and an even number record area, the combination of outputs I₁ and I₂ from the Q̄-terminals of the flip-flops becomes "1:0" or "0:1". Therefore, the combination of input levels at the load data input terminals LA and LB will be "1:0" in both cases. On the other hand, when the reproducing head scans only one of the odd number record area and the even number record area, the combination of outputs I₁ and I₂ will be "1:1" or "0:0". Therefore, the combination of load data inputs LA and LB will be "0:1".

The memory switching disabling circuit 53 also has a load input LOAD which is connected for input from a switching timing detector circuit 57 to receive a detector signal CT. The switching timing detector circuit 57 generally comprises a pair of D-flip-flops D₅₁ and D₅₂. The D-flip-flop D₅₁ receives the switching signal FR at its D-terminal. The Q-terminal of the flip-flop D₅₁ is connected to the D-terminal of the second-stage flip-flop D₅₂. Also, the Q-terminal of the first-stage flip-flop D₅₁ is connected to one input of an exclusive-OR gate EX. To the other input of the exclusive OR gate EX, the Q̄-terminal of the second-stage flip-flop D₅₂ is connected. The exclusive OR gate EX derives the logical sum of the outputs from the flip-flops D₅₁ and D₅₂. The logical sum derived by the exclusive-OR gate EX serves as the detector signal CT of the switching timing detector circuit 57. The detector signal CT drops to logical 0 from logical 1 when the switching signal FR switches state. The trailing edge of the logical-1 detector signal CT triggers the memory switching disabling circuit 53 to sample the values at its load data inputs LA and LB.

Therefore, when driving direction is reversed from forward to reverse or from reverse to forward, the load data "1:0" or "0:1" are read from the load data inputs LA and LB. The memory switching disabling circuit 53 is then responsive to the output of the NAND gate 51 produced in response to the switching pulses $CH_1$ and $CH_2$. Assuming that the inputs through the load data inputs LA and LB are "1:0", the memory switching disabling circuit 53 outputs a carrier signal CA after two successive inputs from the NAND gate 51. On the other hand, assuming the load data inputs LA and LB are "0:1", then the memory switching disabling circuit 53 outputs the carrier signal CA after the next input from the NAND gate 51.

The carrier signal CA is conducted to the memory selection switching circuit 52 via an inverter 58 and serves as an enabling signal for the memory selection switching circuit. When enabled by the carrier signal CA, the memory selection switching circuit 52 can increment or decrement the memory selection code. The memory switching disabling circuit 53 is held in this condition until the next detector signal CT is received from the switching timing detector circuit 57.

As will be appreciated herefrom, when the head drive is reversed while the reproducing head is scanning both an odd number record area and an even number record area, the memory selection switching circuit 52 is disabled until two switching pulses $CH_1$ and $CH_2$ are received. On the other hand, when the head drive is reversed while the reproducing head is scanning only one of the odd number and even number record areas, the memory selection switching circuit 52 is disabled until the next single switching pulse $CH_1$ or $CH_2$.

As shown in FIG. 8, when the video tape is driven in the forward direction, image data of the odd number fields and even number fields $O_{11}$, $E_{11}$, $O_{12}$, $E_{12}$, $O_{13}$, $E_{13}$ are input as reproduction input data Vin. During this forward reproduction operation, when the reproducing head scanning the odd number record area $O_{11}$ approaches the trailing boundary track J, the reproducing head starts to scan the even number record area $E_{11}$ as well. Of course, when the reproducing head scans across both an odd number record area $O_{11}$ and an even number record area $E_{11}$, the reproducing input signal Vin contains image data from both the odd number field $O_{11}$ and the even number field $E_{11}$.

The memory selection switching circuit 52 of the address control circuit 19 outputs the memory selection code QC, QB and QA as described previously. This memory selection code is labeled "SELECTION CODE" in FIG. 8. As shown in FIG. 8, when the tape is driven in the forward direction, the memory selection code follows the sequence "100", "101", "110", "111", "010", "011". The memory selection switching circuit 52 sends the memory selection code to the load address converter circuit 54 to designate one or two of the field memories 13, 14 and 15 for storage of the image data contained in the reproduction input signal Vin and the remaining field memory 13, 14 or 15 for access to and reproduction of the previously stored image data.

In the example shown in FIG. 8, when the reproducing head starts scanning the odd number record area $O_{11}$, the memory selection code is "011", and therefore, the image date from the record area $O_{11}$ is stored in the third field memory 15. At the same time, the image data in the record area $E_{10}$ is stored in the second field memory 14, as shown in the TABLE I. After completing the scan of the record area $E_{10}$, the memory selection code changes to "100". Therefore, the third field memory 15 is continuously designated for storage of the image data from the record area $O_{11}$. At this time, the second field memory 14 is designated for access to the stored image data. Upon reaching the trailing boundary track J, the reproduction input data Vin starts to include image data from both the odd number record area $O_{11}$ and the even number record area $E_{11}$. As a result, the first field memory 13 is designated for storage of the image data from the record area $E_{11}$.

When the second detector output OEG is output during scanning of the trailing boundary track J of the odd number record are $O_{11}$, the switching pulse $CH_1$ or $CH_2$ is output from one of the differentation circuits 44 and 45. The memory selection switching circuit 52 then increments the switching pulse so that the memory selection code becomes "101". As a result, the first field memory 13 is still used to store the image data from the even number record area $E_{11}$. On the other hand, the third field memory 15 is designated for retrieval of stored image data from the record area $O_{11}$. The image data read from the third field memory 15 is output as the reproduction output Vout.

In summary, in response to each switching pulse $CH_1$ or $CH_2$, the memory selection code is incremented by 1 while the tape is driven forward. Incrementing the memory selection code reallocates the field memories for storage and retrieval of image data. Of course, the image data to be read out of field memory is the same image data stored in the last storage operation.

When the tape drive is reversed from forward to reverse while only the even number record area $E_{13}$ is being scanned, in which case the memory selection code is "011", the timing detector circuit 57 is triggered by the forward/reverse switching signal FR to output the detector signal CT to the memory switching disabling circuit 53. At this time, the inputs $I_1$ and $I_2$ to the exclusive OR gate 55 are "0:0". Therefore, the load data inputs LA and LB are "1:0". As a result, the memory switching disabling circuit 53 outputs a disabling signal to the memory selection switching circuit 52 through the inverter 58. At this time, since a single record area is being scanned, the memory selection switching circuit 52 is disabled until the next switching pulse $CH_1$ or $CH_2$. Therefore, in this state, the second field memory 14 is still designated for storage of image data contained in the reproduction input signal Vin. At the same time, the first field memory 13 is designated for retrieval of image data. As the reproducing head approaches in reverse the leading boundary track A of the record area $E_{13}$, the switching pulse $CH_1$ or $CH_2$ is input to the memory section switching circuit 52 and the NAND gate 51 outputs a pulse to the memory switching disabling circuit 53. Since the load data inputs LA and LB read "1:0", the memory switching disabling circuit 53 responds to the NAND gate output by sending the carrier signal CA to the memory selection switching circuit 52. As a result, the memory selection switching circuit 52 is enabled to decrement the switching pulses $CH_1$ and $CH_2$.

During this initial stage after reversal of the tape drive direction from forward to reverse, the reproducing head, as it approaches the loading boundary track A of the record area $E_{13}$, starts scanning across the tracks in the record area $O_{13}$.

Even after receipt of the enabling carrier signal CA, the memory selection code in the memory selection switching circuit 52 remains "011". Therefore, the third memory 15 is newly designated for storage of the image data from the record area $O_{13}$. Also, the first field memory 13 continues to be accessed for retrieval of image data.

When the scanning of the record area $O_{13}$ is finished, the switching pulse $CH_1$ or $CH_2$ is again input to the memory selection switching circuit 52. The memory selection switching circuit 52 decrements the switching pulse $CH_1$ or $CH_2$.

Figure 9:
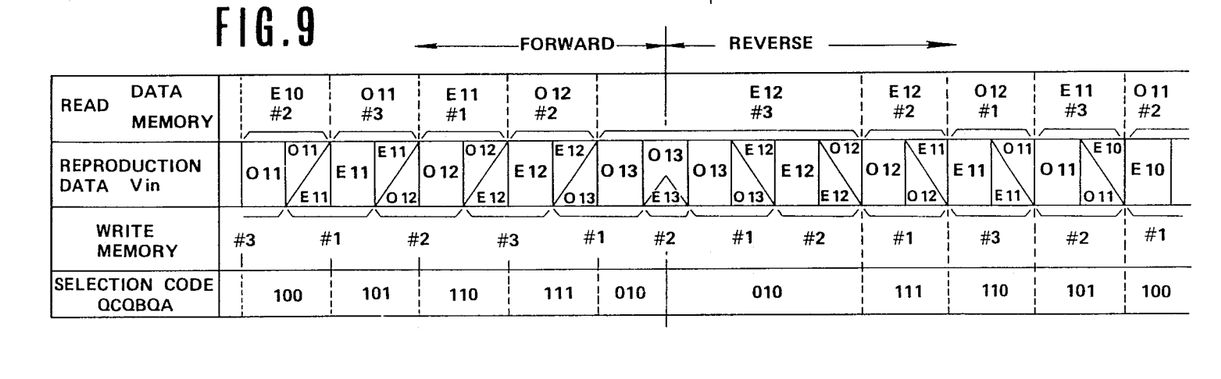

FIG. 9 illustrates the situation in which the tape drive is reversed from forward to reverse while the reproducing head is scanning both an odd number record area $O_{13}$ and an even number record are $E_{12}$. The switching timing detecting circuit 57 produces the detector signal CT in response to the forward/reverse switching signal FR. The memory switching disabling circuit 53 is responsive to the detector signal CT to read the load data inputs LA and LB. In this case, the load data inputs LA, LB are of the combination "0:1", the memory switching disabling circuit 53 sends a disabling signal to the memory selection switching circuit 52 to disable counting operation of the latter for two occurrences of the switching pulses $CH_1$ or $CH_2$. Therefore, after being disabled, the memory selection switching circuit 52 will not respond to the next two switching pulses $CH_1$ or $CH_2$. Since the memory selection code at the moment of reversal of the tape drive was '010', this code value is maintained until the third successive switching pulse $CH_1$ or $CH_2$.

For instance, as seen from FIG. 9, since the third field memory 15 was being accessed for retrieval of image data when the forward/reverse switching signal FR arose, it continues to be accessed until the third switching pulse $CH_1$ or $CH_2$ is received. During this period, the second field memory 14 is used for storage of image data from the record area $E_{13}$ and the first field memory 13 is used for storage of image data from the record area $O_{13}$. After completion of the scan of the record area $E_{13}$, the first switching pulse $CH_1$ or $CH_2$ is sent to the memory selection switching circuit 52 and also to the memory switching disabling circuit 53 through the NAND gate 51. However, since the memory selection remains disabled, the memory selection code remains "010". Therefore, the image data in the record area $O_1$ continues to be stored in the first field memory 13 and image data stored in the third field area 15 continues to be retrieved for video reproduction. As will be appreciated from FIG. 9, the image data to be read out during this period is the image data from the record area $E_{12}$ stored before reversal of the tape drive direction.

As the tape continues in reverse, the reproducing head reaches the boundary between the record areas $O_{13}$ and $E_{12}$ and starts to pick up image data from both record areas. As shown in FIG. 9, the image data from the record area $E_{12}$ is stored in the second field memory 14, at this time. When the scanning of the record area $O_{13}$ is finished, the second switching pulse $CH_1$ or $CH_2$ is output. As a result, the memory switching disabling circuit 53 is triggered to output the carrier signal CA. The memory selection switching circuit 52 is responsive to the carrier signal CA received via the inverter 58 to return to its enabled state.

At this time, however, since the second switching pulse $CH_1$ or $CH_2$ does not change the memory selection code, the image data from the record area $E_{12}$ continues to be stored in the second field memory 14. Also, the image data from the record area $E_{12}$ stored in the third field memory 15 continues to be retrieved.

After completion of the scan of the record area $E_{12}$, the third switching pulse $CH_1$ or $CH_2$ is produced. The memory selection switching circuit 52 decrements the memory selection code to "111" in response to the third switching pulse $CH_1$ or $CH_2$. As a result, the first field memory 13 is designated for storage of image data from the record area $O_{12}$. At the same time, the second field area, now holding image data from the record area $E_{12}$, is designated for retrieval. Therefore, the video image reproduced on the video monitor remains unchanged.

After this, video image data are scanned, stored, retrieved and reproduced in the same manner as explained with respect to forward tape drive. The only difference is the order of update of the memory selection code, which is the reverse of that in forward tape drive.

While the present invention has been disclosed above in terms of the preferred embodiment of the invention, the invention should not be appreciated as being limited to the shown embodiment, but includes all possible embodiments and modifications of the embodiment which do not depart from the principle of the invention set out in the appended claims.

For example, although three field memories have been used in the shown embodiment, more field memories can be used.

What is claimed is:

1. A method for reproducing a video signal recorded on a video tape with the image data for one video field being recorded in the form of a plurality of track blocks, comprising the steps of:

providing at least three field memories each adapted for storage of image data for one field picked up from the video tape and for later retrieval therefrom for video reproduction;

selectively accessing one of said field memories for storage of said image data therein, and switching access to another of said field memories after all of the image data for one field has been stored in said one field memory;

selectively accessing a second one of said field memories for retrieval of image data therein, and switching access to another of said field memories when image data other than that retrievable from said second field memory is to be retrieved;

detecting reversal of the direction of tape drive movement between a forward direction and a reverse direction;

detecting whether or not the image data being reproduced at the time of said detection of reversal of the direction of tape drive movement includes data from more than one field; and disabling said switching of access to another of said field memories for retrieval for a selected period in response to detection of reversal of said tape drive direction, said selected period having a duration that depends upon whether or not the image data being reproduced at the time of said detection of reversal of direction of tape drive movement includes data from more than one field.

2. The method as set forth in claim 1, which also includes the steps of detecting image data on the video tape from a field other than the field from which image data is being stored and accessing another field memory not currently in use for storage or retrieval for storage of the image data of said other field.

3. The method as set forth in claim 1, wherein said selected period is variable in such a manner that, when said image data being reproduced includes data from a single field the selected period is shorter than when said image data being reproduced includes data from more than one field.

4. The method as set forth in claim 3, wherein said switching among the field memories or disablement thereof, is triggered by a pulse signal produced each time the scanning of one record area is completed.

5. The method as set forth in claim 1, wherein said switching among the field memories or disablement thereof is triggered by a pulse signal produced each time the scanning of one field is completed.

6. An apparatus for reproducing a video signal recorded on a recording medium in the form of a plurality of tracks comprising:
  a reproduction head for scanning said tracks on the recording medium;
  memory means including at least three memories, each capable of holding all of the image data for one video field picked up from the medium by said scanning reproduction head;
  storage control means for selecting one of said memories in said memory means for storage of the image data of the video field currently being scanned by the head, said storage control means selecting memories in a given order and detecting inclusions of image data from more than one field in an input video signal from said head;
  retrieval control means for selecting said memories each currently holding one field of image data in a predetermined sequence for retrieval of the stored image data therefrom as an output video signal;
  memory condition detecting means for monitoring the selection condition of said memories;
  a drive direction detecting means for detecting reversal of drive direction of said medium; and
  a memory selection disabling means, responsive to reversal of said drive direction, for disabling selection of a different memory for retrieval and output of the stored data for a period of time having a duration that depends upon whether or not image data from more than one field is being reproduced at the time of detection of reversal of said drive direction.

7. The apparatus as set forth in claim 6, wherein said memory condition detecting means detects image data on the video tape from a field other than the field from which image data is being stored and said retrieval control means is responsive to said image data other than the field from which image data is being stored for accessing another memory not currently in use for storage or retrieval for storage of the image data of said other field.

8. The apparatus set forth in claim 6, wherein said memory selection disabling means derives a first relatively shorter period when a single memory is selected for storing image data for a single field and a second relatively longer period when two memories are selected for storing image data for two fields.

9. The apparatus as set forth in claim 6, wherein said memory condition detecting means includes a pulse generator which produces a pulse signal each time the scanning of one field of image data is completed.

10. The apparatus as set forth in claim 9, wherein said disabling period starts in response to reversal of the medium drive and ends in response to the pulse signal produced by the pulse generator.

11. An apparatus for reproducing a video signal recorded on a recording medium in the form of a plurality of tracks, comprising:
  a head for reproducing the video signal recorded in said tracks;
  memory means including at least three memories, each capable of holding all of the image data for one field picked up from the recording tracks of the recording medium by said head;
  storage control means for selecting said memories in said memory means for storage of the image data from the field currently being picked up by said head, said storage control means selecting the memories in a given order and detecting inclusion of image data from more than one field in an input video signal from said head and, in response thereto, selecting more than one memory for storage of image data for said more than one field, respectively;
  retrieval control means for selecting said memories currently holding one field of image data in a predetermined sequence for retrieval of the stored image data therefrom as an output video signal;
  a memory condition selecting means for monitoring the selection condition of said memories;
  a drive direction detecting means for detecting reversal of the drive direction of said medium; and
  a memory selection disabling means responsive to reversal of the tape drive direction for disabling selection of a different memory for retrieval and output of the stored data for a period of time having a duration that depends upon whether or not image data from more than one field has been detected by said storage control means as included in said video input signal at the time of said detection of reversal of said drive direction.

12. The apparatus as set forth in claim 11, wherein said memory condition detecting means includes a signal generator which produces a memory switching demand each time the scanning of one field of image data is completed.

13. The apparatus as set forth in claim 11, wherein said storage control means include counter means for counting said memory switching demand for deriving a binary code, and a look-up table to be looked up in terms of said binary code for deriving a memory selection control signal which identifies said memories for writing said image data.

14. The apparatus as set forth in claim 13, wherein said retrieval control means is also responsive to said memory selection control signal for selecting one of said memories for retrieval and output of the stored image data.

15. The apparatus as set forth in claim 11, wherein said memory condition detecting means is adapted to detect the selection condition of said memory means between a first condition in which a single memory is selected for storing one field of image data, and a second condition in which two memories are selected for storing two fields of image data.

16. The apparatus as set forth in claim 15, wherein said memory selection disabling means derives said disabling period of time in such a manner that, when said memory condition detecting means detects said first condition, a first relatively shorter period is derived, and when said memory condition detecting means detects said second relatively condition, a second longer period is derived.

17. The apparatus as set forth in claim 16, wherein said first period corresponds, to a period of time in which one memory switching demand is input, and said second period corresponds, to a period of time in which two of said memory switching demand are input.

18. The apparatus as set forth in claim 13, wherein said memory condition detecting means is adapted to detect the selection condition of said memory means between a first condition in which a single memory is selected for storing one field of image data, and a second condition in which two memories are selected for storing two fields of image data.

19. The apparatus as set forth in claim 18, wherein said memory selection disabling means derives said disabling period of time in such a manner that, when said memory condition detecting means detects said first condition, a first relatively shorter period is derived, and when said memory condition detecting means detects said second relatively condition, a second longer period is derived.

20. The apparatus as set forth in claim 19, wherein said first period corresponds to a period of time in which one memory switching demand is input, and said second period corresponds to a period of time in which two of said memory switching demands are input.

21. The apparatus as set forth in claim 20, wherein said counter means is adapted to count up said memory switching demand to increment said binary code by 1 at every occurrence of said memory switching demand, while said drive direction detecting means detects driving of the video tape in a first direction, and to count down said memory switching demand to decrement said binary code by 1 at every occurrence of said memory switching demand, while said drive direction detecting means detects driving of said video tape in a second direction opposite to said first direction.

22. The apparatus as set forth in claim 21, wherein said signal generator includes a detector for detecting a rotary head position scanning at least one of leading and trailing boundaries of a record area constituted by a plurality of tracks for generating said memory switching demand.

* * * * *

UNITED STATES PATENT AND TRADEMARK OFFICE
CERTIFICATE OF CORRECTION

PATENT NO. : 4,751,589

DATED : June 14, 1988

INVENTOR(S) : Hisanori Kominami et al.

It is certified that error appears in the above-identified patent and that said Letters Patent is hereby corrected as shown below:

Column 1, line 52, change "field" to --fields--.

Column 5, line 26, change "serves" to --serve--.

Column 7, line 14, change "OE" to --EE--;
         line 35, change "SO" to --OS--;
         line 57, change "occurence" to --ocurrence--.

Column 8, line 6 and 7 delete "each have a preset terminal PR receiving the circuits $D_{11}$";
         line 6, after "$D_{12}$" insert --as a trigger signal. The flip-flop circuit $D_{11}$--.

Column 9, line 62, change "Selected" to --connected--.

Column 12, line 18, change "$I_H$" to --$\overline{I_H}$--.

Column 14, line 12, change "differentation" to --differentiation--.

IN CLAIMS

Column 18, line 67, delete --,--.

Column 19, line 1, delete --,--;

UNITED STATES PATENT AND TRADEMARK OFFICE
CERTIFICATE OF CORRECTION

PATENT NO. : 4,751,589

DATED : June 14, 1988

INVENTOR(S) : Hisanori Kominami et al.

It is certified that error appears in the above-identified patent and that said Letters Patent is hereby corrected as shown below:

Column 19, line 2, change "demand" to -- demands --.

Signed and Sealed this

Fourteenth Day of February, 1989

Attest:

DONALD J. QUIGG

*Attesting Officer*        *Commissioner of Patents and Trademarks*